United States Patent [19]

Brown

[11] 4,302,131

[45] Nov. 24, 1981

[54] ANCHOR ELEMENTS

[75] Inventor: John V. Brown, Granborough, England

[73] Assignee: Fosroc International Limited, England, England

[21] Appl. No.: 49,839

[22] Filed: Jun. 18, 1979

[51] Int. Cl.³ ............................................. E21D 20/02
[52] U.S. Cl. ..................................... 405/260; 405/244
[58] Field of Search ........ 405/259, 216, 244, 260–262; 118/DIG. 11, DIG.12; 156/294

[56] References Cited

U.S. PATENT DOCUMENTS

| | | | |
|---|---|---|---|
| 1,988,628 | 1/1935 | McDonald et al. | 118/DIG. 11 |
| 2,560,369 | 7/1951 | Roberts | 156/294 X |
| 2,824,033 | 2/1958 | Donaldson | 156/294 X |
| 3,553,970 | 1/1971 | Wiswell | 405/216 |
| 3,641,772 | 2/1972 | Dietrich | 405/259 |
| 3,690,110 | 9/1972 | Wiswell | 405/216 |
| 3,753,354 | 8/1973 | Bauer | 405/260 |
| 3,941,531 | 3/1976 | Parker | 118/DIG. 11 |
| 4,110,991 | 9/1978 | Torkuhl | 156/294 X |
| 4,112,637 | 9/1978 | Herbst | 405/259 X |

FOREIGN PATENT DOCUMENTS

| | | | |
|---|---|---|---|
| 804088 | 4/1951 | Fed. Rep. of Germany | 405/262 |
| 2039109 | 2/1972 | Fed. Rep. of Germany | |
| 2302412 | 7/1974 | Fed. Rep. of Germany | 405/260 |
| 2443282 | 1/1976 | Fed. Rep. of Germany | 405/259 |
| 2557978 | 7/1976 | Fed. Rep. of Germany | |
| 2511863 | 9/1976 | Fed. Rep. of Germany | |
| 2637676 | 2/1978 | Fed. Rep. of Germany | |
| 2138796 | 1/1973 | France | |
| 2335319 | 7/1977 | France | |
| 2353682 | 12/1977 | France | |
| 2381167 | 9/1978 | France | |
| 2397492 | 2/1979 | France | |
| 521487 | 5/1972 | Switzerland | |
| 1293620 | 10/1972 | United Kingdom | 405/261 |

OTHER PUBLICATIONS

New Civil Engineer, 2 Aug. 1979, p. 20 & 21.
Ground Anchor System, Loksleeve HD2, A Fosroc Company of the Foseco Minsep GP., Ref. PD 99, 10/78.

*Primary Examiner*—Dennis L. Taylor
*Attorney, Agent, or Firm*—Caesar, Rivise, Bernstein & Cohen, Ltd.

[57] ABSTRACT

A method of making on site a ground anchor having at least double corrosion protection about the anchor element, comprises locating a number of fixed lengths of corrosion proof sleeve about the element, applying a cap to the sleeve at the end of the element, and supplying a self-setting composition into the sleeve via the cap to fill an annular clearance between the sleeve and the element. The cap may be left in place on the end of the anchor to protect the anchor during insertion thereof into a borehole. The sleeve preferably comprises an outer plastics layer, an inner metal layer, and an intermediate layer of set filler.

14 Claims, 3 Drawing Figures

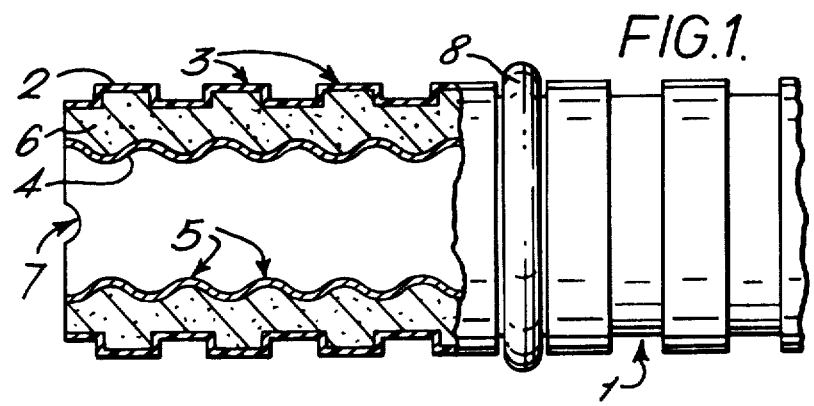
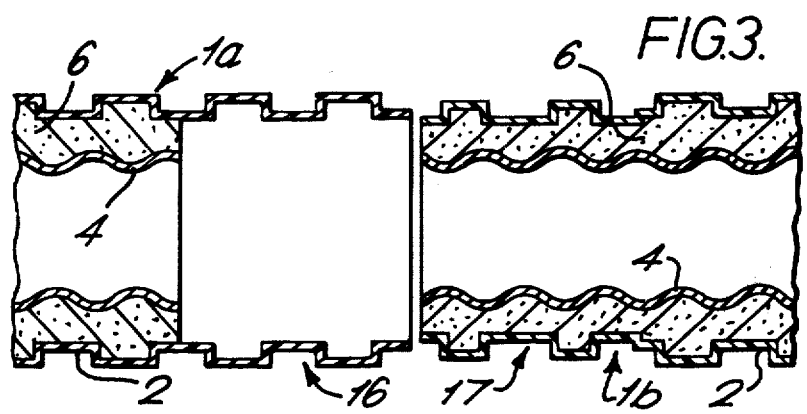
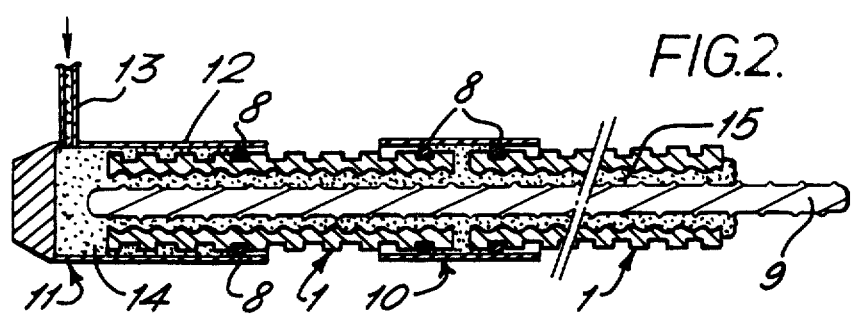

ANCHOR ELEMENTS

This invention concerns ground anchors for use in the civil engineering, construction and mining industries for example.

There is a requirement for ground anchors to have at least a double corrosion protection about the central anchor element, such as that provided by a waterproof sleeve which is grouted on to the element. Such anchors are known, but the sleeves are applied to the anchor element in a factory and each anchor must be purpose-built. This make it expensive to manufacture and transport a small number of anchors for a specific application, and there is often a long delay before the anchors can be delivered to the site of use. There is therefore a need for a simple and cheap way of corrosion proofing an anchor element on site to specific requirements, and this invention fulfills that need.

According to the invention there is provided a method of at least double corrosion proofing an anchor element on site, comprising (i) locating a sufficient number of lengths of corrosion proof sleeve in end-to-end relation about an end portion of the anchor element to cover the length of the element to be corrosion proofed, (ii) applying a cap to the sleeve at the end of the anchor element, the cap having an inlet for self-setting composition, and (iii) supplying a self-setting composition through the inlet, via the cap, into an annular clearance between the element and the sleeve there to set to secure the sleeve to the element.

Preferably the cap is secured to the anchor element by means of the self-setting composition to seal the end of the anchor against ingress of moisture and to protect the leading end of the anchor during insertion into a hole.

The sleeve lengths will usually be connected together such that the sleeve is sealed against escape of self-setting composition during introduction of the composition into the sleeve.

Preferably the sleeved anchor element is upwardly inclined away from the cap for best escape of air whilst the self-setting composition is supplied into the sleeve.

The inlet is preferably located in the side of the cap. When the anchor is upwardly inclined for introduction of self-setting composition, the inlet is less liable to damage in this location, and the inlet is less likely to become blocked by dirt.

The sleeve preferably has at least two corrosion-proof layers. It is especially preferred for the sleeve to comprise three layers, the intermediate layer being of set filler such as a resinous or a cementitious grout and at least one of the other two layers being of plastics. Most preferably the sleeve comprises an outer layer of plastics, an intermediate layer of set filler and an inner layer of metal. The metal inner layer serves to strengthen the sleeve for handling purposes.

The anchor element may be a bar such as Macalloy or Dividag bar having either a plain or a ribbed profile. Plain bars may be used with threaded nuts and plain washers, the nuts being screw-threaded on to a co-operatively threaded end portion of the bar. Ribbed bars do not require the use of a nut and washer, but rely instead upon the ribs to transfer the load to the sleeve.

The method is particularly useful for corrosion proofing strand tendons. Known factory methods require "noding" of each strand to transfer the stress from the strands to the sleeve. This noding involves removal of a polypropylene coating from the length of the tendon to be corrosion proofed, followed by untwisting of the strands and thorough cleaning off of any grease from the strands. A node is then applied to each strand whereupon the strands are re-twisted and secured inside the sleeve. The nodes serve to lock the strands to the sleeve.

When the method of the invention is used to corrosion proof a strand tendon on site, the plastics sheathing is stripped off the tendon and the tendon surface is wiped free of grease without untwisting the strands. A metal ferrule is then compressed onto the end of the tendon for best transfer of tendon load to the sleeve. The sleeve is then secured to the end portion of the tendon by the method of the invention.

The sleeve should have longitudinally spaced apart external circumferential ribs and should be internally threaded to respectively provide a good key between the sleeve and the grout used to secure the element in the hole and between the sleeve and the self-setting composition which is used to secure the sleeve to the anchor element.

The invention includes a ground anchor made by the method, and further includes the sleeve lengths themselves as new items of commerce.

The invention is described below by way of example with reference to the accompanying diagrammatic drawings in which FIG. 1 is a side view, partly in section, of a length of sleeve for use in the method, FIG. 2 is a sectional view showing the sleeve being secured to an anchor element in the method of the invention, and FIG. 3 is a sectional view of an alternative method of securing together two sleeve lengths.

The sleeve 1 of FIG. 1 comprises an outer tube 2 of plastics, the tube having spaced-apart castellations 3, an inner steel tube 4 having a thread 5, and an intermediate layer of set polyester resin 6. Both ends of the sleeve 1, only one end being shown for convenience in FIG. 1, have two diametrically opposite recesses 7. Towards each end of the sleeve, an O-ring 8 is located about the tube between the castellations 3.

In use, a ribbed steel bar 9, FIG. 2, to be corrosion proofed for use as a ground anchor, is mounted on a trestle, not shown, at a construction site. A suitable number of sleeve lengths 1 are fitted over one end of the rod 9 in end-to-end relation. For convenience only two sleeve lengths are shown in FIG. 2. A connecting tube 10 is fitted over the adjacent O-rings 8 of adjacent sleeve lengths. An end cap 11 comprising a mouth portion 12 and a side inlet 13, is fitted over the end of the sleeve. The clearance between the mouth 12 of the end cap 11 and the sleeve 1 is sealed by the adjacent O-ring 8.

A polyester resin grout 14 is then pumped through the inlet 13 of the cap 11 into the annular clearance 15 between the sleeve and the rod. The anchor is upwardly inclined away from the end cap for best escape of air during introduction of the grout. The grout is forced into the clearance between adjacent ends of the sleeve lengths there to provide a moisture-proof seal. The recesses 7 facilitate passage of the grout between the sleeve ends and also act as keys more firmly to secure the sleeve lengths together by means of the grout within the recesses.

After sufficient time to allow the polyester grout to harden, the inlet 13 is sawn off and the anchor located in a hole in a substrate in known manner. The cap 11 serves as a guide for the anchor and protects the leading end of the anchor during insertion into a hole. The grout within the end cap 11 seals the end of the anchor against penetration of moisture.

A strand tendon may be used in place of the rod 9. In this case, the tendon is prepared by removing the protective sheath along the length of the tendon to be corrosion proofed. The bared tendon is then thoroughly degreased and a ferrule is compressed on to the end of the tendon. The tendon is then sleeved as described, the ferrule being located within the cap 11.

FIG. 3 shows an alternative way of joining together adjacent sleeve lengths. The external plastics layer 2 of one sleeve length 1a has a female extension 16, and the same layer of the adjacent sleeve length 1b has a male extension 17. The extensions 16, 17 are screw-threaded one into the other.

The method of the invention allows corrosion-proof anchors to be made quickly and cheaply on site to meet individual requirements. The sleeve is capable of transferring the maximum load of the anchor element to the borehole grout, provided a sufficient length of sleeve is used. The minimum length of sleeve for full load transfer ranges from 4 m for a 110 mm external diameter sleeve, to 1.5 m for a 65 mm external diameter sleeve.

I claim:

1. A method of at least double corrosion proofing an anchor element on site outside a hole in a substrate, in which hole the anchor is to be installed, comprising
(i) at the site locating a sufficient number of lengths of corrosion proof sleeve in end-to-end relation about an end portion of the anchor element to cover the length of the element to be corrosion proofed while the element is outside the hole,
(ii) applying a cap to the sleeve at the end of the anchor element, the cap having an inlet for self-setting composition, and being secured to the anchor element,
(iii) supplying a self-setting composition through the inlet, via the cap, into an annular clearance between the element and the sleeve there to set to secure the sleeve to the element,
(iv) locating the formed corrosion proofed anchor element in the hole in the substrate and
(v) grouting the element in the hole.

2. A method according to claim 1, in which the cap is secured to the anchor element by means of the self-setting composition.

3. A method according to claim 1 in which the sleeved anchor element is upwardly inclined away from the cap whilst the self-setting composition is supplied into the sleeve.

4. A method according to claim 1, in which the inlet is located in the side of the cap.

5. A method according to claim 1, in which the sleeve has at least two corrosion-proof layers.

6. A method according to claim 5, in which the sleeve comprises three layers, the intermediate layer being of set filler and at least one of the other two layers being of plastics.

7. A method according to claim 6, in which the sleeve comprises an outer layer of plastics, an intermediate layer of set filler and an inner layer of metal.

8. A method according to claim 1, in which the anchor element is a bar having a plain or a ribbed profile.

9. A method according to claim 1, in which the anchor element is a strand tendon.

10. An anchor, comprising an anchor element, a plurality of sleeve lengths being located in end-to-end relation about an end portion of the element, the sleeve lengths being secured to the element by means of a self-setting composition located between the element and the sleeve, the sleeve comprising an outer layer of plastics having external castellations, an intermediate layer of set filler and an inner layer of metal being internally threaded, and a cap being secured to an end of the anchor by means of a self-setting composition.

11. A sleeve for use in the anchor of claim 10, comprising an outer layer of plastics and an inner layer of metal.

12. A sleeve according to claim 11, which includes an intermediate layer of set filler.

13. A sleeve according to claim 11 in which the sleeve has longitudinally spaced apart external circumferential ribs.

14. A sleeve according to claim 11 in which the sleeve is internally threaded.

* * * * *